United States Patent [19]

Stanley et al.

[11] Patent Number: 5,155,468
[45] Date of Patent: Oct. 13, 1992

[54] ALARM CONDITION DETECTING METHOD AND APPARATUS

[75] Inventors: Lawrence G. Stanley, Templeton; Charles J. Metyka, Jr., Westminster; Robert W. Farley, Gardner, all of Mass.

[73] Assignee: Sinmplex Time Recorder Co., Gardner, Mass.

[21] Appl. No.: 525,281

[22] Filed: May 17, 1990

[51] Int. Cl.$^5$ .............................................. G08B 29/00
[52] U.S. Cl. .................................. 340/501; 340/511; 340/588
[58] Field of Search ............... 340/501, 505, 506, 511, 340/514, 518, 588, 589, 870.09, 870.16, 870.17, 870.21, 825.08

[56] References Cited

U.S. PATENT DOCUMENTS

| | | | |
|---|---|---|---|
| 4,514,720 | 4/1985 | Oberstein et al. | 340/511 |
| 4,644,331 | 2/1987 | Matsushita et al. | 340/511 |
| 4,727,359 | 2/1988 | Yuchi et al. | 340/511 |
| 4,749,986 | 6/1988 | Otani et al. | 340/511 |
| 4,749,987 | 6/1988 | Ishii | 340/511 |
| 4,796,025 | 1/1989 | Farley et al. | 340/825.08 |

OTHER PUBLICATIONS

"Fenwalnet 4000 TM " (Dec., 1988).
"Smoke Detectors for Fire Protective Signaling Systems", Standard for Safety UL 268 (May 2, 1989).

Primary Examiner—Donnie L. Crosland
Attorney, Agent, or Firm—Panitch Schwarze Jacobs & Nadel

[57] ABSTRACT

Methods for detecting an alarm condition includes repeatedly converting an ambient condition into voltage outputs in detector apparatus repeatedly converting the voltage outputs into a series of actual analog values, polling the series of actual analog values to determine an average analog value, repeatedly comparing the difference between the average analog value and the last actual analog value with a predetermined delta-threshold value and indicating an alarm condition when the difference between the average analog value and the last actual analog value exceeds the delta-threshold value. Methods for detecting an alarm condition further includes repeatedly comparing the average analog value with a maintenance threshold value and indicating a maintenance signal when the average analog value exceeds the maintenance threshold value.

29 Claims, 6 Drawing Sheets

| START | FORMAT CODE | ADDRESS | PARITY | DATA | CHECK SUM | STOP |

*FIG. 6a*

| START | FORMAT CODE | ADDRESS | PARITY | STOP |

*FIG. 6b*

| START | FORMAT CODE | ADDRESS | PARITY | DATA | CHECK SUM | STOP |

*FIG. 6c*

ALARM CONDITION DETECTING METHOD AND APPARATUS

FIELD OF THE INVENTION

The present invention is generally related to alarm condition detection systems and, more specifically, smoke and fire detection methods and apparatus.

BACKGROUND OF THE INVENTION

Conventional fire and smoke detection methods and apparatus generally include the use of well-known smoke and heat detectors, such as ionization smoke detectors and photooptical smoke detectors. These devices are used as independent detector systems, such as in home use, or as peripheral devices reporting alarm conditions to in a centralized system as is commonly used in larger buildings and industrial use.

Whether these devices are used as stand alone systems or peripheral devices, the principle of their operation is generally the same. For example, a light-scattering type photooptical detector generally comprises a light emitting source, such as light-emitting diode (LED), and a light sensor, such as a photo diode, contained in a substantially light proof sample chamber having low reflectance walls. Light from the light-emitting source is reflected off the low reflectance walls to the light sensor, which is out of the direct path of light. Air surrounding the photooptical detector passes generally freely in and out of the sample chamber. When ambient air is relatively free from fire or combustion products, such as smoke, only a relatively small amount of light from the LED is reflected off the chamber walls to be received by the light sensor. This low light receiving condition is the normal or no-alarm state in the photooptical detector.

As the amount of combustion products increases, the amount of light reflected or scattered by the combustion products increases. The increased light scattering generally increases the amount of light reaching the light sensor proportionally. This phenomenon generally correlates to percent obscuration per foot which is defined by Underwriters Laboratories, Inc. (UL) Standard 268 (May 2, 1989). A simple explanation of percent obscuration per foot is the reduction in visibility the human eye would see in a room containing combustion products.

Figure 1A:
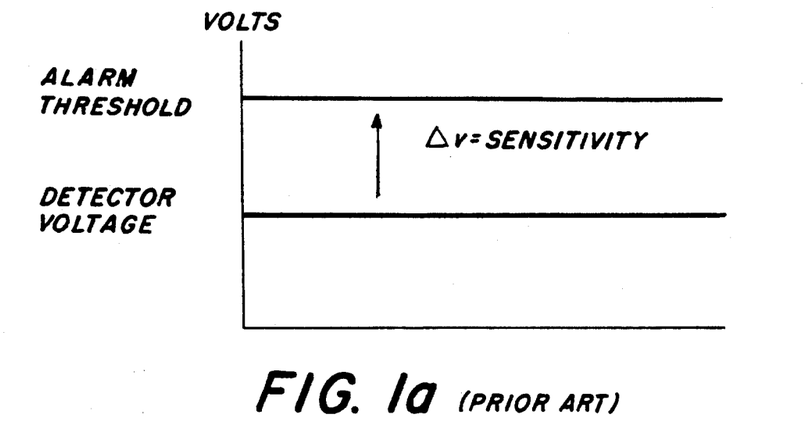
FIG. 1a is a graph illustration of the voltage output of an operating conventional fire and smoke alarm and the voltage output needed to indicate an alarm.

The amount of light detected by the light sensor may be represented as a generally steady direct current voltage output, such as between 0 Vdc and 5 Vdc, for example. This may be illustrated as the generally flat curve labeled "Detector Voltage" in FIG. 1a. As the amount of light detected by the light detector increases due to increased combustion products, the voltage output generally increases. Conventional ionization detectors also output increasing voltage as the smoke condition rises. When the detector voltage output reaches a predetermined threshold, (illustrated as the flat curve labeled "Alarm Threshold" in FIG. 1a) an alarm condition is indicated by audible, visual or other indications for appropriate investigation or evacuation of the alarm area.

While this method is recognized as being generally effective, the problem encountered is that such a device generally becomes dirty with age and upon exposure to combustion products, dust and other film-forming contaminants. Thus, photooptical detectors must be cleaned or replaced periodically, especially after exposure to combustion products. Until cleaning or replacement of the detector unit can be made, the sensitivity of these conventional devices is adversely affected. Thus, for example, as the amount of contaminants increases and collects on the chamber walls of the photooptical detector, the amount of light perceived to be transmitted increases and the voltage output alters to indicate increased percent obscuration per foot. This perceived increase in percent obscuration per foot will exist in a dirty photooptical detector even when the air is substantially free from all combustion products.

Similar contamination problems occur in ion detectors. In addition to dust and film formation, other factors affecting detectors include humidity, altitude (ionization, especially), wind velocity (ionization, especially), voltage supply variations, detector component tolerances and component aging.

Figure 1B:
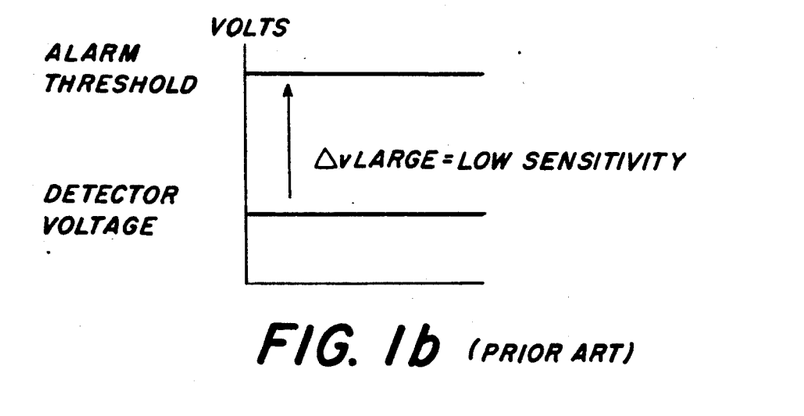
FIG. 1b is a graph illustration of the voltage output of a relatively clean conventional fire and smoke detector and the voltage output needed to indicate an alarm.
Figure 1C:
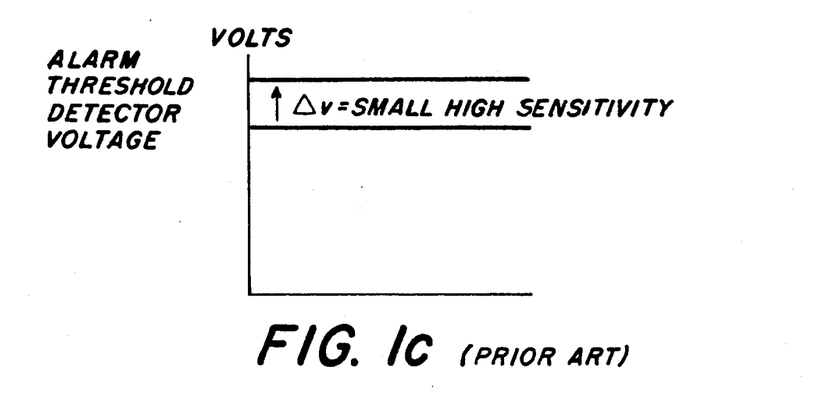
FIG. 1c is a graph illustration of a relatively dirty conventional fire and smoke detector and the voltage output needed to indicate an alarm.

The sensitivity of conventional devices may be measured as the difference between the voltage output at substantially combustion free ambient conditions and the predetermined alarm threshold of the individual detector. For example, a low sensitivity system may be seen in FIG. 1b, where the difference between the Detector Voltage and the Alarm Threshold is relatively large. High sensitivity is illustrated in FIG. 1c, where the difference between the Detector Voltage and the Alarm Threshold is relatively small. Thus, as the voltage output increases due to accumulated dirt and combustion products, the sensitivity increases where the alarm threshold remains the same. Therefore, the addition of even small, transient combustion products or dust particles, increasing light scattering, when combined with increased sensitivity of the dirty detector, often results in false alarms.

Because the threshold voltage of conventional detectors is typically set via a potentiometer and resistor divider network in the detector head, the sensitivity of a given detector may be adjusted by manually adjusting the alarm threshold up or down to achieve the desired sensitivity. Desired sensitivity may also be restored in photooptical detectors, for example, by cleaning the chamber and LED and light sensor components, thereby reducing the detector voltage output. However, these adjustments require that a skilled technician disassemble the detector at its location which is both inconvenient and non-cost effective. Moreover, these adjustments are only temporary and must be performed periodically. In addition, such periodic adjustments do not compensate for the day-to-day unpredictable changes in dust and other contaminant accumulation in the detector.

In view of the deficiencies and inefficiencies of the prior art, it would desirable to have an alarm detection system which recognizes and compensates for changes in detector sensitivity due to various factors on a real-time basis.

SUMMARY OF THE INVENTION

According to the present invention, a method for detecting an alarm condition comprises repeatedly converting an ambient condition at a predetermined location into voltage outputs, repeatedly converting the voltage outputs into a series of actual analog values, polling the series of actual analog values to determine an average analog value and repeatedly comparing the difference between the average analog value and the last actual analog value with a predetermined delta-threshold value indicating an alarm condition when the difference between the average analog value and the last actual analog value exceeds the delta-threshold value.

BRIEF DESCRIPTION OF THE DRAWINGS

The foregoing summary of the invention, as well as the following detailed description of preferred embodiments, will be better understood when read in conjunction with the appended drawings. For the purpose of illustrating the invention, there is shown in the drawings embodiments which are presently preferred, it being understood, however, that the invention is not limited to the specific arrangements and instrumentalities disclosed. In the drawings:

FIG. 4b is a continuation of the flow chart of FIG. 4a.

DETAILED DESCRIPTION OF PREFERRED EMBODIMENTS

Figure 3:
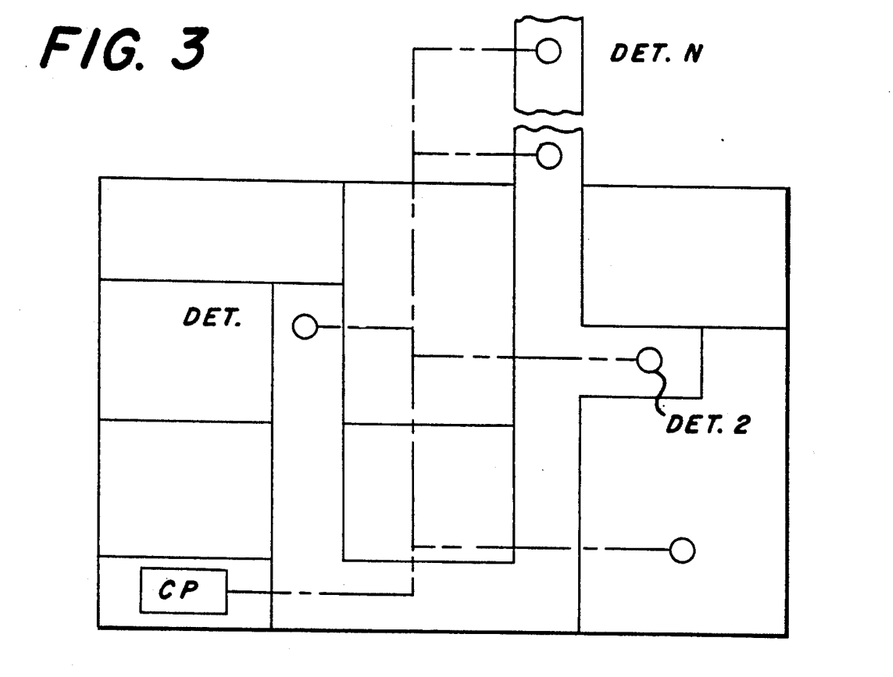
FIG. 3 is a schematic illustration of a building having peripheral detector devices interconnected with a central control panel in accordance with the present invention.

Referring to FIG. 3, the preferred alarm detection system according to the present invention comprises a plurality of peripheral sensors or detectors DET. 1, DET. 2 ... DET. N which may be located at strategic positions in a building or other structure where fire or smoke detection is desired. These peripheral devices are connected via communication lines as illustrated in FIG. 3 for preferably centralized control and monitoring of the peripheral devices in a control panel CP. One presently preferred peripheral device/control panel communication system is disclosed in U.S. Pat. No. 4,796,025, the specification of which is incorporated herein by reference.

It is presently anticipated that three basic technologies will be used in the peripheral devices, namely photooptical, ionization and heat or temperature sensor devices. One skilled in the art will appreciate, however, that the method according to the present invention may be adapted to additional smoke and fire detector devices which may currently exist or may be developed in the future. While the specific characteristics of each peripheral device are not critical to the present invention the peripheral devices must be capable of communicating individual identification or address to the control panel so that information regarding ambient conditions received by the control panel may be stored in and retrieved from data storage means unique to each of a plurality of peripheral devices and so that, in the event of alarm, malfunction or maintenance conditions, an individual detector may be readily identified by reference to the control panel.

Generally, photooptical, ionization and heat sensors comprise sampling chambers where an ambient condition is converted to a direct current voltage. One example of a suitable sensor device is the Model 2098-9201 Photoelectric Smoke Sensor available from Simplex Time Recorder Co. To communicate with the control panel in accordance with the present invention, the peripheral devices must have an analog to digital (A/D) converter capable of converting the direct current voltage signal to digital values. For example, a conventional A/D converter, such as the MAX154BC A/D converter manufactured by Maxim, will convert a 0 to 5 Vdc signal to 8 bit digital values between 0 and 255 for digital communication with the control panel, although other A/D converters may be used.

Further in accordance with the present invention, it is presently preferred that all decision making regarding alarm conditions occurs in the control panel which preferably comprises commercially available software or firmware processing and storage devices which may be programmed to perform, store and retrieve the various calculations and comparisons according to the present invention. One presently preferred microprocessor is the Intel 8096 microcontroller. Electric memory or storage devices may include commercially available CMOS static RAM devices. It is generally preferred that the peripheral devices merely monitor ambient conditions at the peripheral device locations and return analog values in digital form to the control panel, although certain decision tasks prompted by the control panel may be performed by the peripheral device to speed communications with the control panel as discussed below.

Figure 4A:
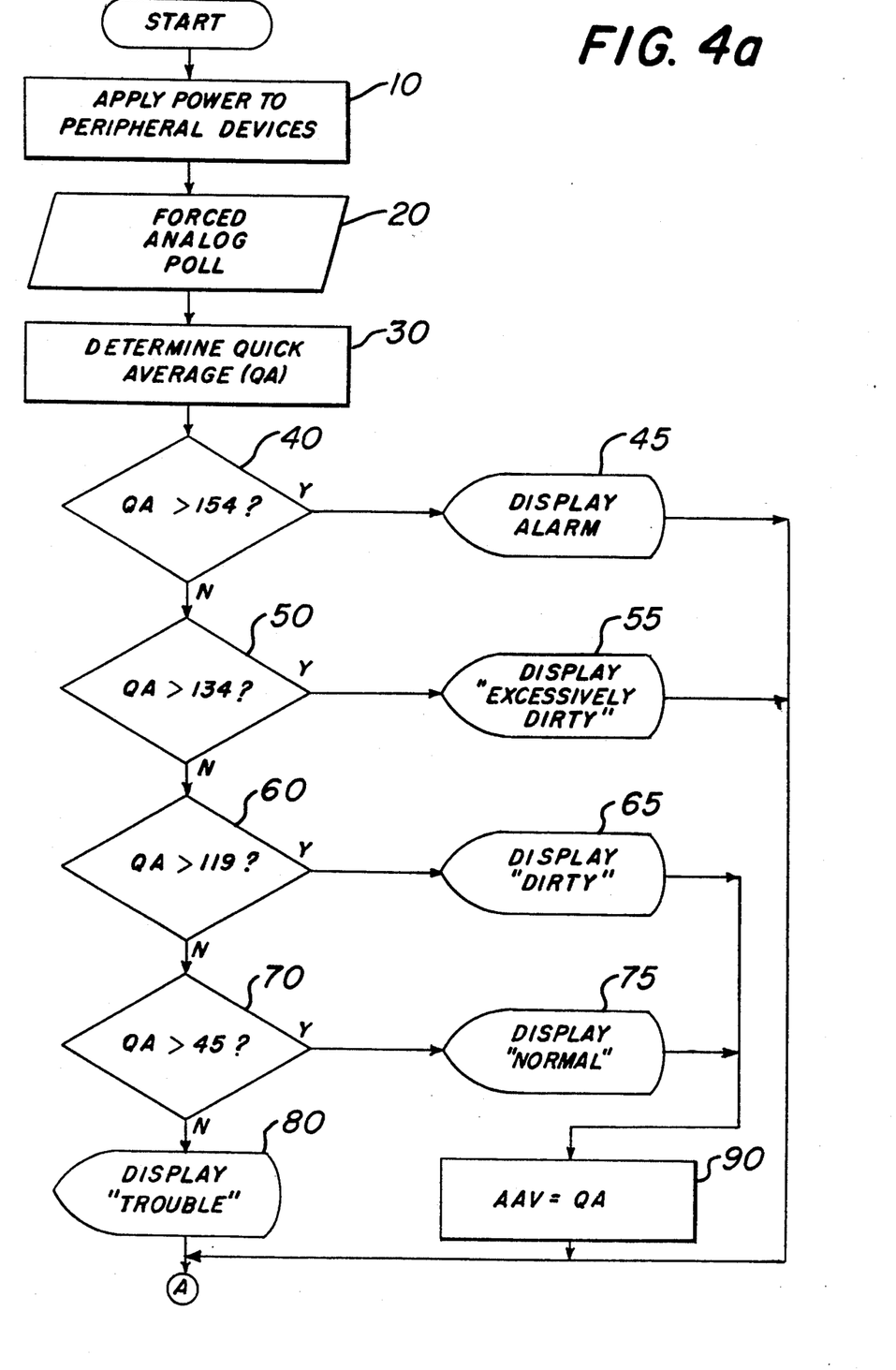
FIG. 4a is a flow chart for the control panel according to the present invention.
Figure 4B:
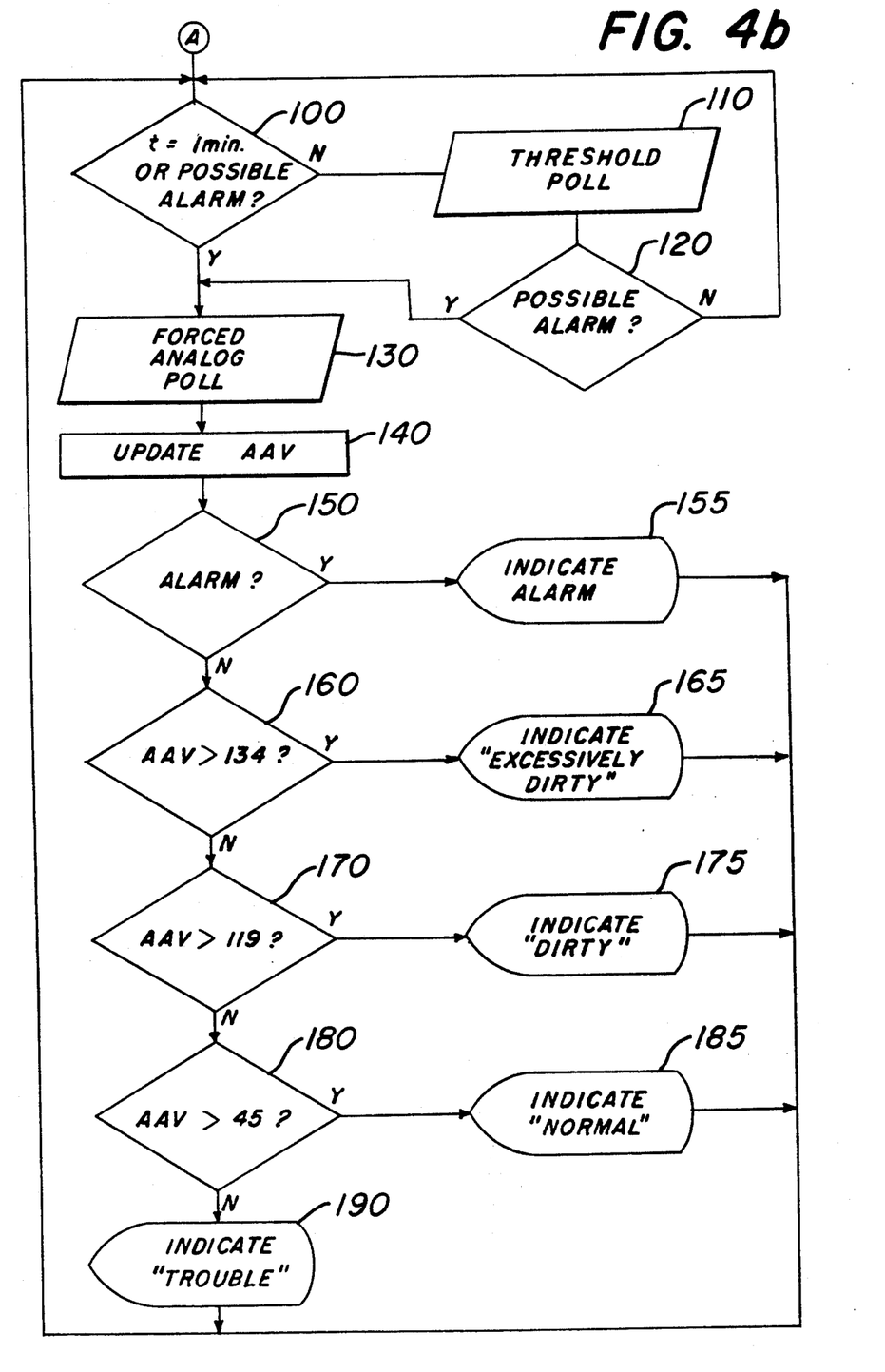

Referring to FIGS. 4a and 4b, the peripheral devices are powered into operation 10 using a power source which may be readily determined by one skilled in the art in view of this disclosure and based on the particular detector device used. Once powered (and assuming the power-up procedure discussed below has been performed, passing connector A in FIG. 4a), a polling procedure is performed by the control panel to communicate with the peripheral device. During polling, a command or request is sent by the control panel to the peripheral device. The peripheral device then samples the environmental air. Sampling is generally continuous in ionization and heat devices and is typically intermittent in photooptical devices to conserve power and prolong the life of photooptical detector components. An actual analog value from the sampling chamber in the form of a voltage output is then digitized by the A/D converter. The digitized actual analog value is then returned to the control panel, completing the poll of the particular peripheral device. As used in this specification, the term "actual analog value" is used to identify the digitized analog value indicating the current or latest condition of a given peripheral device.

This polling procedure is repeated periodically and fairly frequently to constantly update the most current ambient condition of the peripheral devices. It is presently preferred that the control panel poll the peripheral devices about once every 4 seconds, although one skilled in the art of fire protection systems will appreciate that more or less frequent polls may be performed in accordance with the present invention.

Figure 6A:
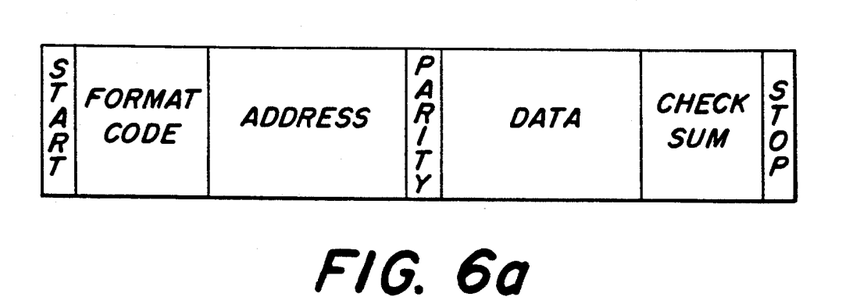
FIG. 6a is a schematic illustration of a first embodiment of a data stream returned by a peripheral device in accordance with the present invention.

One method of polling by the control panel is the forced analog polling method which is disclosed generally at column 17, lines 16 through 44 of U.S. Pat. No. 4,796,025. With a forced analog poll, the peripheral device monitoring ambient conditions is commanded by a signal generated by the control panel to transmit the digitized actual analog value to the control panel. The presently preferred form of the data stream returned by a peripheral device during a forced analog poll in accordance with the present invention is illustrated in FIG. 6a and comprises a start bit to indicate the beginning of the poll return, a 5-bit format code indicating the amount of data to be sent by the peripheral device, an 8-bit address indicating the location and type of peripheral device, a parity bit, an 8-bit data field containing the digitized actual analog value, a 5-bit check sum field used to check the success of the transmission and a stop bit, indicating the end of the poll return; a total of 29 bits.

In larger systems where a relatively large number of peripheral devices are polled every 4 seconds, for example, it will be appreciated that the forced analog poll method will require that the control panel request and receive a relatively large amount of data. Generally, as the frequency and amount of information increases, the communication time required to poll (i.e., request and receive) data from the peripheral devices increases. To decrease communication time, it is presently preferred to perform polling using the threshold poll method in place of forced analog polling. The threshold poll method is generally disclosed at column 15, line 57 through column 16, line 59 of U.S. Pat. No. 4,796,025.

In the threshold poll method, the peripheral device is configured so that the digitized actual analog value is compared at the peripheral device end with a predetermined initial or pre-alarm threshold value each time the peripheral device is polled by the control panel. The initial threshold value may be downloaded to the peripheral device from the control panel during polling so that the value can be updated periodically. The initial threshold value is preferably a value less than the value which would indicate an alarm condition (discussed below).

Figure 6B:
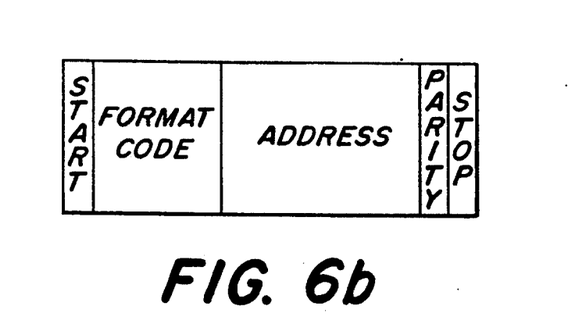
FIG. 6b is a schematic illustration of a second embodiment of a data stream returned by a peripheral device in accordance with the present invention.

If the actual analog value does not exceed the predetermined initial threshold value, a first status code representing "no change in status" is transmitted to the control panel in response to the polling request. The presently preferred form of the data from the peripheral device in a threshold poll in accordance with the present invention for a "no change in status" code return is illustrated in FIG. 6b and comprises a start bit, a 5-bit format code field indicating "no change in status", an 8-bit address, a parity bit and a stop bit; a total of 16 bits.

Figure 6C:
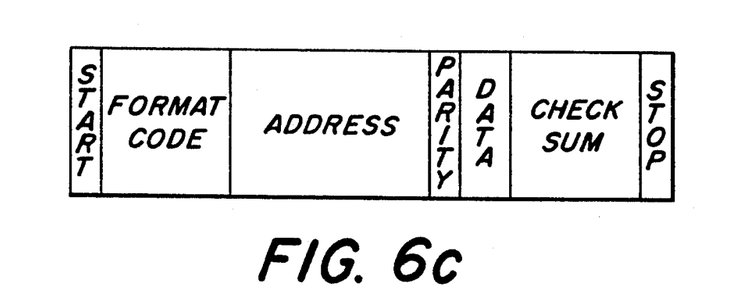
FIG. 6c is a schematic illustration of a third embodiment of a data stream returned by a peripheral device in accordance with the present invention.

If the actual analog value exceeds the initial threshold value, a second status code representing "possible alarm" is transmitted in response to the polling request from the control panel. The presently preferred form of the data from the peripheral device for a "possible alarm" code during threshold polling is illustrated in FIG. 6c and comprises a start bit, a 5-bit format code indicating that a 2-bit data field is to be sent, an 8-bit address, a parity bit, a 2-bit data field indicating a "possible alarm" condition, a 5-bit check sum field and a stop bit; a total of 23 bits.

As illustrated in FIG. 4b, it is presently preferred that threshold polling 11 is conducted in the absence of a possible alarm (N path after 100). The control panel polls the peripheral devices with the same frequency as in the forced analog poll method, but merely requests one of two formats illustrated in FIGS. 6b and 6c. If the "no change in status" code is received by the control panel (N path after 120), no further information is required from the peripheral device and threshold polling 110 continues. When the "possible alarm" code is received, the control panel may then suspend or bypass (Y path after 120) the threshold polling for that device and begin forced analog polling 130 as described above. Forced analog polling is repeated for that peripheral device until the actual analog value retreats below the initial threshold.

Where the threshold poll method is used in accordance with the present invention, a forced analog poll will be required periodically to obtain actual analog values from the peripheral device to update the ambient condition perceived sampled by the peripheral device as discussed more fully below. For example, where a threshold poll 110 is conducted once every four seconds, a forced analog poll 130 may be conducted once per minute (as determined by decision 100 in FIG. 4b), although more frequent or fewer forced analog polls may be conducted depending on the number of peripheral devices, the speed and efficiency of the control panel in communicating with the peripheral devices and the desired speed of communications, among other factors.

Further in accordance with the present invention, the control panel is configured so that the actual analog values returned from the forced analog polling requests are compiled and calculated as an average analog value 140. The "average analog value" is the average of many actual analog values taken over time. It is presently preferred that the average analog value is updated once a minute, although one skilled in the art will appreciate that the average analog value may be updated more or less frequently depending on the number of peripheral devices to be polled, the communication speed of the fire alarm system, the type of detection desired and other factors readily understandable to one skilled in the art of fire detection systems in view of this disclosure.

The average analog value calculated in accordance with the present invention is used as a reference value to determine when a change in the actual analog value is large enough to indicate an alarm. By averaging the actual analog values, longer-term environmental effects, such as dirt and dust accumulation, are essentially filtered out. The average analog value may be determined by adding a given number of actual analog values divided by the given number. The average analog value may be updated at desired intervals by repeatedly performing this computation dropping the oldest actual analog value and adding the latest actual analog value. Preferably, however, especially where it is desired to minimize the amount of memory necessary to store a given number of past actual analog values, the average analog value is determined according to the present invention using the following equation:

$$AAV = \frac{\sum_{n=1}^{c} A_{(c)} - \frac{\sum_{n=1}^{c} A_{(c)}}{c} + A_{(c+1)}}{c} \quad (I)$$

wherein AAV is the average analog value, c is a constant positive whole number value, $$\sum_{n=1}^{c} A_{(c)}$$

is the sum of c actual analog values and $A_{(c+1)}$ is the last or just-received actual analog value.

The constant value c should be large enough to stabilize the average analog value without filtering out true alarm conditions. For example, some studies have shown that smoldering fires build up smoke slowly for a period of about 6 hours before a flame or fire occurs. It is important, therefore, not to over-stabilize such longer term transient conditions by under-averaging. Further, if the constant value c is too large, the average analog value will not change enough over time and, therefore, not effectively filter out longer-term environmental effects.

Preferably, the constant value c is about 512 to about 16,384 where average analog value updating occurs once per minute. It will be understood by one skilled in the art in view of this disclosure that this constant value c range may be higher or lower depending on the frequency of the average analog value update and the amount of stabilization desired. It is presently preferred that c is 2048 where light scattering photooptical detectors are used, although it will be appreciated that larger or smaller constants may be used. At c=2048 with updating once per minute, the average analog value will be changed 63% over 36 hours - - - short enough so as to not filter out longer-term smoke conditions, such as smoldering fires.

Using Equation I provides an updated average analog value that changes relatively slowly with time. The average analog value thus provides a stable reference that can be used to measure instantaneous or transient changes in actual analog values generated from the peripheral devices. For example, assume that an average analog value has been established at 75. At time(t)=1 hour, transient cigarette smoke moves the actual analog value to 105, where it remains at that level for two hours, then dropping back to 75. Applying these actual analog values to the method of the present invention, the average analog value changes as indicated in Table I:

TABLE I

| Time(t) in Hours | Average Analog Value |
|---|---|
| 0 | 75.00 |
| 1.0 | 75.00 |
| 1.5 | 75.43 |
| 2.0 | 75.85 |
| 2.5 | 76.26 |
| 3.0 | 76.67 |

Further according to the present invention, the sensitivity of conventional fire and smoke detectors may be maintained at a relatively constant level despite voltage output fluctuations due to aging, etc. by comparing the difference between the most recent output (last actual analog value) from a given peripheral device and the average analog value for that peripheral device against a predetermined value we have called a "delta-threshold". The delta-threshold is to be contrasted with conventional alarm threshold levels which are relatively fixed over time (see FIGS. 1a, 1b and 1c). According to the present invention, there is no preset threshold voltage. Instead, a delta-threshold establishes a variable threshold level based on the change in the most recent actual analog value from the average analog value.

The delta-threshold desired for a particular peripheral device type may be established after comparing many samples of known ambient conditions using such standardized testing as the UL Standard 268 smoke box to characterize typical analog values generated at varying known ambient conditions. For example, Table II illustrates the expected delta-threshold for a light-scattering type photooptical detector at different percent obscuration per foot values.

TABLE II

| %/Ft. | Delta-Threshold |
|---|---|
| 0.5 | 15 |
| 1.0 | 28 |
| 1.5 | 42 |
| 2.0 | 55 |
| 2.5 | 68 |
| 3.0 | 82 |
| 3.5 | 98 |
| 3.7 | 100 |

The delta-threshold is maintained at a constant level for the percent obscuration per foot rating desired. If, for example, the percent obscuration per foot at which an alarm indication is desired is 0.5, the delta-threshold to be used would be 15.

According to the present invention, the actual analog value required to reach the alarm point is the sum of the average analog value plus the delta-threshold. For this reason, it will be appreciated that the sensitivity is thus held relatively constant because, as the average analog value changes, the actual analog value necessary to trigger an alarm changes proportionally.

Figure 2:
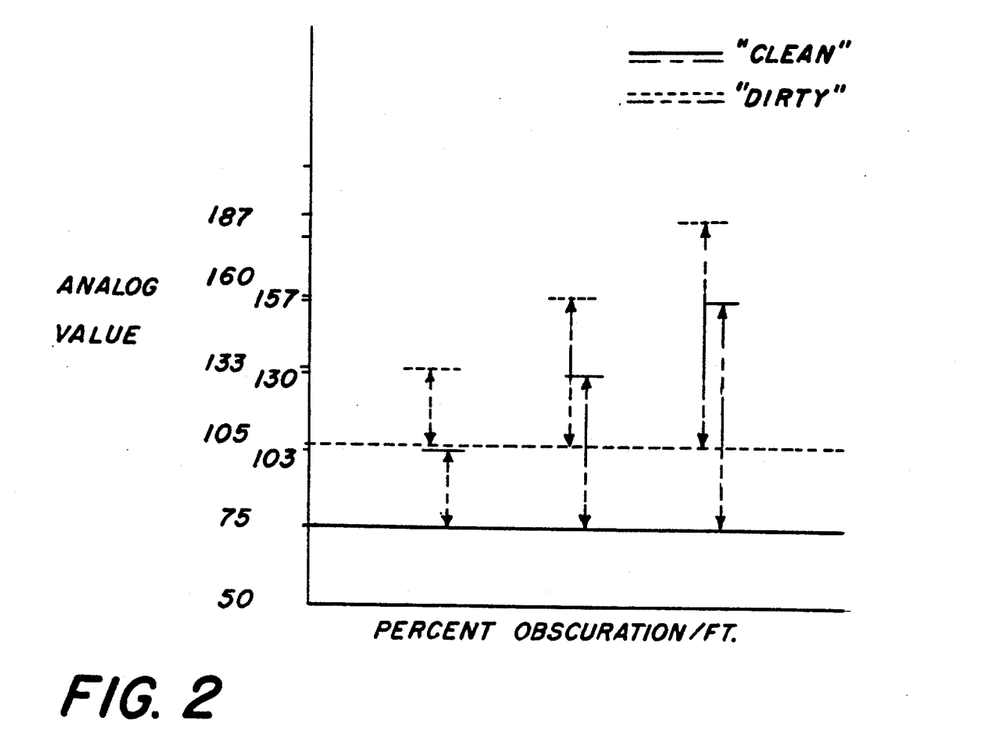
FIG. 2 is a graph illustration of sensitivity compensation according to the present invention.

The effect of a delta-threshold according to the present invention is illustrated in FIG. 2. A new peripheral detector device has, for example, an average analog value of 75. Where it is desired to have an alarm condition at 1%, 2% or 3% obscuration per foot, the actual analog value necessary to indicate an alarm is the average analog value plus the delta-threshold for the percent obscuration per foot desired or 103, 130 and 157, respectively, indicated by the solid lines in FIG. 2. A contaminated detector has, for example, an average analog value of 105. For an alarm condition to exist, the same desired delta-threshold is now applied to the average analog value, resulting in actual analog values of 133, 160 and 187, respectively, needed before an alarm condition can be indicated. The sensitivity (graphically illustrated in FIG. 2 as the distance between the average analog value and the actual analog value needed for alarm) at each of the desired percent obscuration per foot levels remains the same, despite the shift in voltage output from a clean detector to a dirty detector.

The control panel of the present invention is configured to apply the appropriate delta-threshold value depending on the type of peripheral device identified and the sensitivity desired. The control panel may be configured to apply only one delta-threshold if it is known that the fire detection system uses only one type of peripheral device and only one sensitivity, for example. Alternatively, where a fire detection system according to the present invention provides means for identifying o addressing individual peripheral devices, the control panel may be configured to assign the appropriate delta-threshold to the average analog value established for each of the identified peripheral devices. This allows the free interchangeability of different types of detectors and also allows the use of detectors having differing sensitivities in one system.

Referring again to FIG. 4b, in accordance with the present invention, in response to each forced analog polling request by the control panel, the most current or last actual analog value is returned to the control panel from each peripheral device along with address and other communication data. The control panel then compares 150 the last actual analog value with the actual analog value for the peripheral device just polled.

The comparison 150 is performed by first determining the difference between the last actual analog value and the average analog value. This difference is then compared to the predetermined delta-threshold value for the particular type of peripheral device polled. If the difference between the last actual analog value and the average analog value exceeds the delta-threshold value, an alarm condition is said to exist (Y path after 150). Once an alarm condition is determined, the control panel may indicate this condition 155 by generating an audible or visual alarm, which may include additional information, such as peripheral device location. If no alarm condition exists, normal polling 100 may be resumed.

Figure 5:
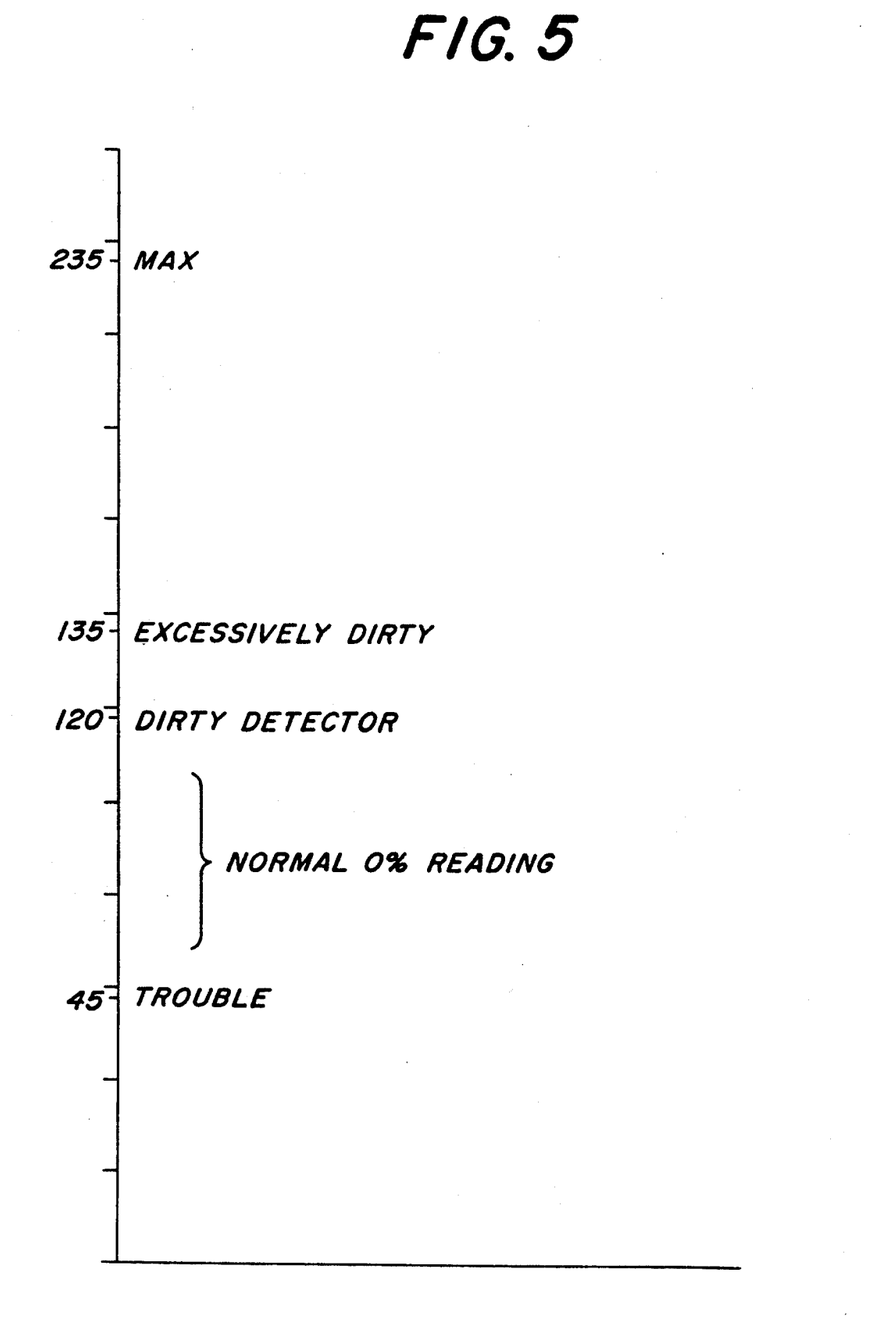
FIG. 5 is a graph illustration of the voltage outputs of a light-scattering photooptical detector device in accordance with the present invention.

In addition to alarm conditions, the method according to the present invention may be used advantageously to determine various maintenance or malfunction problems associated with each peripheral device. For example, FIG. 5 illustrates the characteristic voltage output (after A/D conversion) expected from a typical photooptical smoke detector. Generally, a photooptical detector will generate a digital value of between about 46 and 119 under normal ambient conditions (NOMINAL 0% READING). A value below 46 generally indicates that the photooptical detector is operating improperly (TROUBLE). Contamination of the photooptical detector over time tends to shift the voltage output up above the normal operational output values of the photooptical detector. Once the average analog value reaches 120, the photooptical detector is generally said to be dirty and requires cleaning (DIRTY DETECTOR).

Further according to the present invention as shown in FIG. 4b, therefore, it may be desired to configure the control panel to further compare the average analog value with predetermined maintenance threshold values 150. Once the average analog value exceeds or falls below any of these maintenance values, an appropriate maintenance signal is generated 160.

Assuming the average analog value is 120 and that the desired delta-threshold is 98 (3.5 percent obscuration per foot), the photooptical detector having the characteristics illustrated in FIG. 5 will indicate an alarm when the last actual analog value reaches 218. This range is still within the operating limits of the typical photooptical detector. However, as the average analog value increases, the sensitivity of the peripheral device will eventually be beyond correction or stabilizing by the present method. For example, at an average analog value of 135, an alarm condition can only be indicated when the last actual analog value would have to exceed the sum of 135 (the average analog value) and 98 (the delta-threshold) or 233. An actual analog value of 233 is dangerously close to the typical maximum analog value of 235 and the sensitivity cannot be guaranteed. Thus, it would be desirable to perform maintenance on the detector or replace the detector entirely.

According to the present invention, when the average analog value is compared (160, 170 and 180) against, for example, a first maintenance threshold value to indicate an "excessively dirty" condition (above 134, e.g.), a second maintenance threshold value to indicate a "dirty" condition (above 120, e.g.) and a third maintenance threshold value to indicate an "normal" condition (above 45, e.g.), a first code may be sent 165 by the control panel to indicate cleaning or replacement maintenance, a second code 175 for cleaning maintenance and a third code 185 for normal status. A fourth threshold level may indicate "trouble" (below 46, e.g.) with a detector having a suspiciously low output and, where the average analog output drops below this fourth maintenance threshold value, an appropriate maintenance indication may be generated 190. One skilled in the art will appreciate in view of this disclosure that additional maintenance thresholds may be used in accordance with the present invention.

In addition, to avoid maintenance codes turning on and off too frequently as the average analog value rises and falls, it may desired to have a hysteresis built into the first, second and third threshold comparisons. Thus, once the average analog value of a given peripheral device exceeds (or drops below) the threshold value, the average analog value must drop sufficiently below (or rise sufficiently above) that threshold before the maintenance indication is cleared. It is presently preferred that the maintenance hysteresis is 5 below the first and second maintenance threshold values and 5 above the third maintenance threshold value, respectively, although it will be readily appreciated that greater or lesser hysteresis values may be used. For example, when a peripheral device reaches an average analog value of 120 ("dirty") the average analog value must drop below 115 before the maintenance indicator will clear.

The ability to compensate for relatively long-term adverse environment changes using the present invention significantly improves the ability to monitor high contaminant zones using detectors previously avoided for use in such locations. For example, heating, ventilating and air conditioning (HVAC) ducts are generally difficult to monitor with photooptical detectors because of high dust and other particulate contamination of the detector components. Moreover, maintenance of detectors in HVAC ducts is difficult because of their relative inaccessibility. Using the methods of the present invention, however, such installations are more feasible due to the ability to compensate for contamination over time without accessing the peripheral device directly and the ability to more easily identify contaminated or worn-out detectors at which time appropriate maintenance may be scheduled.

The calculation of an average analog value for each peripheral device in accordance with the present invention provides a very stable reference which can be used to measure instantaneous and transient changes in the actual analog value of the peripheral device. However, as discussed above, the stability of the average analog value is proportional to the number of actual analog values used to calculate the average analog value. One skilled in the art will appreciate that when a fire detection system using the method according to the present invention is first powered up, there is no "history" or series of actual analog values from the peripheral devices in the system to provide a stabilized basis for alarm decisions. Thus, as shown in FIG. 4a, it may be desired to perform a power-up procedure to stabilize the fire detection system relatively quickly to avoid false alarms after first turning the system on.

It is presently preferred to have the control panel apply power 10 to the peripheral devices for a period time before polling begins. This allows time for the peripheral devices to stabilize before the control panel begins processing analog readings. The presently preferred time before polling is conducted is about 2 minutes, although one skilled in the art will appreciate that longer or shorter periods of time may be used in accordance with the present invention depending on the type of peripheral devices used and the ambient condition of the system installation.

Preferably, after applying power, the control panel then performs a forced analog poll 20 of each of the peripheral devices at timed intervals for a given period of time. For example, the control panel may perform a forced analog poll of the peripheral devices at intervals of 4 seconds for a period of about 1 minute. Although longer or shorter periods of forced analog polling may be used, 1 minute of forced analog polling at 4 second intervals would provide a series of 15 values from which to determine a quick average analog value for each peripheral device.

Once the quick average value is determined 30, each peripheral device is placed in one of several categories based on the determined quick average (40, 50, 60, 70). For example, Table III divides quick average values of between 0 and 255 into five categories for a typical photooptical peripheral device.

TABLE III

| Range | Quick Average Value | Condition Annunciated | Average Analog Value Set |
|---|---|---|---|
| 1 | 155-255 | Alarm | Average analog value not set |
| 2 | 135-154 | Excessively Dirty | Average analog value not set |
| 3 | 120-134 | Dirty | Quick avg. equals avg. analog value |
| 4 | 46-119 | Normal | Quick avg. equals avg. analog value |
| 5 | 0-45 | Trouble | Average analog value set to 46 |

In Range 1, the power-up procedure of the control panel assumes that the peripheral device is in alarm condition and an alarm condition is indicated 45 at the panel accordingly. In this case, it is preferred that the average analog value is not set until the peripheral device is investigated and reset or replaced and the control panel is cleared or restarted.

In Range 2, the peripheral device appears to be an excessively dirty detector and maintenance is desired before normal polling and average updating (after connector A) may begin. An excessively dirty or maintenance condition will be indicated 55, and the average analog value is not set.

In Range 3, the peripheral device is perceived to be a dirty detector but still operating in a usable range. A dirty or maintenance condition is indicated 65 and the average analog value will be set equal to the quick average determined at power-up 90. The control panel will clear the maintenance indicator only after the average analog value drops below the maintenance hysteresis value.

Range 4 is considered normal for photooptical detectors and the control panel indicates a normal condition 75 and the average analog value is set equal to the quick average determined during power-up 90.

In Range 5, the control panel determines that the peripheral device is not functioning properly. A trouble condition is annunciated 80 and the average analog value is set at a dummy value (46, e.g.) to provide some average value with which the actual analog value may be compared to indicate any alarm condition.

Assuming the peripheral devices are operating within desired normal ranges, normal polling of each device may then proceed.

The present invention may be embodied in other specific forms without departing from the spirit or essential attributes thereof and, accordingly, reference should be made to the appended claims, rather than the specification, as indicating the scope of the invention.

We claim:

1. A method for detecting an alarm condition comprising repeatedly converting an ambient condition into voltage outputs, repeatedly converting the voltage outputs into a series of actual analog values, repeatedly calculating an average analog value from the series of actual analog values, repeatedly calculating a difference between said average analog value and the last actual analog value of the series of actual analog values, repeatedly comparing said difference with a predetermined delta-threshold value, and indicating an alarm condition when the difference between the average analog value and the last actual analog value exceeds the delta-threshold value.

2. The method according to claim 1, wherein the ambient condition is converted into voltage outputs in detector means selected from the group consisting of ionization smoke detectors, photooptical smoke detectors and temperature sensors.

3. The method according to claim 1, wherein the ambient condition is the presence in air of combustion products or heat.

4. The method according to claim 1, wherein the actual analog value is an integer from 0 to 255.

5. The method according to claim 1, wherein the average analog value is calculated as the sum of a constant whole number of actual analog values divided by the constant whole number, where the constant whole number is from about 512 to about 16,384.

6. The method according to claim 1, further comprising repeatedly calculating the average analog value using the following equation I:

$$AAV = \frac{\sum_{n=1}^{c} A_{(c)} - \frac{\sum_{n=1}^{c} A_{(c)}}{c} + A_{(c+1)}}{c} \quad (I)$$

wherein AAV is the average analog value, c is a positive whole number, $$\sum_{n=1}^{c} A_{(c)}$$

is the sum of c actual analog values and $A_{(c+1)}$ is the last actual analog value.

7. The method according to claim 6, wherein c is a whole number from about 512 to about 16,384.

8. The method according to claim 6, wherein c is 2048.

9. The method according to claim 1, further comprising prior to the step of calculating the average analog value, repeatedly comparing the last actual analog value to a predetermined pre-alarm threshold value and generating a first status code if the last actual analog value does not exceed the pre-alarm threshold value and a second status code if the last actual analog value exceeds the pre-alarm threshold value, wherein the remaining steps are not performed until the second status code is generated.

10. The method according to claim 1, further comprising repeatedly comparing the average analog value with a maintenance threshold value and indicating a maintenance signal when the average analog value exceeds the maintenance threshold value.

11. The method according to claim 1, further comprising repeatedly comparing the average analog value with first, second and third maintenance threshold values and indicating a first maintenance signal when the average analog value exceeds the first maintenance threshold value, a second maintenance signal when the average analog value exceeds the second maintenance threshold value and a third maintenance signal when the average analog value is less than the third maintenance threshold value.

12. A method for detecting an alarm condition comprising:
repeatedly converting an ambient condition in a predetermined location into voltage outputs,
repeatedly converting the voltage outputs into a series of actual analog values,
repeatedly comparing the last actual analog value of the series of actual analog values to a predetermined pre-alarm threshold value and generating a first status code if the last actual analog value does not exceed the pre-alarm threshold value and a second status code if the last actual analog value exceeds the pre-alarm threshold value,
calculating an average analog value from the series of actual analog values when the second status code is generated,
repeatedly calculating a difference between said average analog value and the last actual analog value,
repeatedly comparing said difference with a predetermined delta-threshold value, and
indicating an alarm condition when the difference between the average analog value and the last actual analog value exceeds the delta-threshold value.

13. The method according to claim 12, wherein the ambient condition is converted into voltage outputs in detector means selected from the group consisting of ionization smoke detectors, photooptical smoke detectors and temperature sensors.

14. The method according to claim 12, wherein the ambient condition is the presence in air of combustion products or heat.

15. The method according to claim 12, further comprising repeatedly calculating the average analog value using the following equation $$AAV = \frac{\sum_{n=1}^{c} A_{(c)} - \frac{\sum_{n=1}^{c} A_{(c)}}{c} + A_{(c+1)}}{c} \quad (I)$$

wherein AAV is the average analog value, c is a positive whole number, $$\sum_{n=1}^{c} A_{(c)}$$

is the sum of c actual analog values and $A_{(c+1)}$ is the last actual analog value.

16. The method according to claim 15, wherein c is a whole number from about 512 to about 16,384.

17. The method according to claim 15, wherein c is 2048.

18. The method according to claim 12, wherein the first status code indicate no change in status and the second status code indicates a pre-alarm condition.

19. A method for maintaining substantially constant sensitivity in an alarm detection system where sensitivity is a difference between an analog value representative of an ambient condition and an alarm threshold value, comprising the step of determining said analog value and setting an alarm threshold value by adding a predetermined delta-threshold value to the analog value.

20. The method according to claim 19, wherein the analog value is an average analog value determined by converting an ambient condition into a series of actual analog values and calculating the average of said series of analog values.

21. The method according to claim 19, wherein the delta-threshold value is a value correlated to a predetermined percent obscuration per foot.

22. The method according to claim 19, wherein the delta-threshold is a value correlated to a predetermined alarm detector type.

23. The method according to claim 22, wherein the alarm detector type is selected from the group consisting of ionization smoke detectors, photooptical smoke detectors and temperature sensors.

24. The method according to claim 19, wherein the analog value is an average analog value determined by converting an ambient condition into a series of actual analog values and calculating the average of said series of actual analog values and wherein the delta-threshold value is a value correlated to a predetermined percent obscuration per foot and correlated to a predetermined alarm detector type selected from the group consisting of ionization smoke detectors, photooptical smoke detectors and temperature sensors.

25. A method for detecting an alarm condition comprising repeatedly converting an ambient condition detected at a predetermined location into a series of actual analog values, repeatedly calculating an average analog value from the series of actual analog values, repeatedly determining a threshold value based on the average analog value, repeatedly comparing the last actual analog value of the series of actual analog values with the threshold value, and indicating an alarm condition when the last actual analog value exceeds the threshold value.

26. The method according to claim 25, wherein the threshold value is determined by adding a predetermined delta-threshold value to the average analog value.

27. A fire alarm system comprising:
- detector means for converting an ambient condition into a series of actual analog values;
- data calculation means for averaging the series of actual analog values, for determining an alarm threshold value based on the average analog value, and for comparing the last actual analog value of the series of actual analog values with the alarm threshold value;
- means for communicating the series of actual analog values to the data calculating means; and
- means for indicating an alarm condition when the last actual analog value exceeds the alarm threshold value.

28. The fire alarm system according to claim 27, wherein the detector means is selected from the group consisting of ionization smoke detectors, photooptical smoke detectors and temperature sensors.

29. The fire alarm system according to claim 27, wherein the data calculation means comprises means for determining the alarm threshold value by adding a predetermined delta-threshold value to the average analog value.

* * * * *